US010198420B2

(12) United States Patent
Campbell et al.

(10) Patent No.: US 10,198,420 B2
(45) Date of Patent: Feb. 5, 2019

(54) TELLING INTERACTIVE, SELF-DIRECTED STORIES WITH SPREADSHEETS

(71) Applicant: MICROSOFT TECHNOLOGY LICENSING, LLC, Redmond, WA (US)

(72) Inventors: John Campbell, Renton, WA (US); Eric Patterson, Sammamish, WA (US); Uhl Albert, Kirkland, WA (US); Carlos Augusto Otero, Seattle, WA (US); Micah Myerscough, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 589 days.

(21) Appl. No.: 13/918,907

(22) Filed: Jun. 15, 2013

(65) Prior Publication Data

US 2014/0372850 A1    Dec. 18, 2014

(51) Int. Cl.
*G06F 17/24* (2006.01)

(52) U.S. Cl.
CPC .................. *G06F 17/246* (2013.01)

(58) Field of Classification Search
CPC ...................................... G06F 17/22
USPC ....................................... 715/212
See application file for complete search history.

(56) References Cited

U.S. PATENT DOCUMENTS

| | | | |
|---|---|---|---|
| 5,396,621 A * | 3/1995 | MacGregor et al. | 715/809 |
| 5,535,422 A | 7/1996 | Chiang et al. | |
| 6,701,485 B1 | 3/2004 | Igra et al. | |
| 8,271,892 B2 | 9/2012 | Duncker et al. | |
| 8,370,464 B1 * | 2/2013 | Chitilian et al. | 709/220 |
| 2002/0091728 A1 * | 7/2002 | Kjaer | G06F 17/246 715/212 |
| 2004/0114904 A1 * | 6/2004 | Sun et al. | 386/46 |
| 2006/0015521 A1 | 1/2006 | Howey et al. | |

(Continued)

FOREIGN PATENT DOCUMENTS

EP            451963 A2     10/1991

OTHER PUBLICATIONS

Ayalew, Yirsaw, "A Visualization-based Approach for Improving Spreadsheet Quality", ACM, 2010; pp. 13-16.*

(Continued)

*Primary Examiner* — James J Debrow

(57) ABSTRACT

A spreadsheet storytelling engine is provided. The spreadsheet storytelling engine may run in the context of a spreadsheet application on any device, service, or general endpoint capable of running the spreadsheet application. The spreadsheet storytelling engine allows for the authoring and telling of a story. The story is a collection of operations that guide the consumer through a spreadsheet. The story allows the spreadsheet to be used to convey visualizations, data, calculations, or other objects in a spreadsheet in a way that may be simple, pleasant to look at, and/or visually engaging to help a consumer understand the information and internalize it in a way that is actionable without requiring the real time availability of the spreadsheet author. The spreadsheet storytelling engine is useful for purposes including, but not limited to, making presentations, creating tutorials, validating data, explaining how a model works, and generating interactive business intelligence dashboards.

20 Claims, 13 Drawing Sheets

(56) References Cited

U.S. PATENT DOCUMENTS

| | | | |
|---|---|---|---|
| 2006/0271869 A1* | 11/2006 | Thanu et al. | 715/764 |
| 2007/0219956 A1* | 9/2007 | Milton | G06F 17/30 |
| 2007/0233811 A1* | 10/2007 | Rochelle et al. | 709/219 |
| 2008/0189612 A1 | 8/2008 | Zhang et al. | |
| 2008/0215959 A1* | 9/2008 | Lection | 715/201 |
| 2008/0313083 A1 | 12/2008 | Altberg et al. | |
| 2009/0119302 A1* | 5/2009 | Palmer | G06F 17/30368 |
| 2011/0088009 A1 | 4/2011 | Jones et al. | |
| 2012/0115122 A1 | 5/2012 | Bruce et al. | |
| 2012/0192050 A1* | 7/2012 | Campbell | G06Q 10/06 715/212 |

OTHER PUBLICATIONS

Rostvall, et al., "Theoretical and Methodological Perspectives on Designing Video Studies of Interaction", International Journal of Qualitative Methods, vol. 4, Issue 4, Dec. 2005, 26 pages.

Kumar, Ravinder, "Creating an Interactive Tutorial with EXCEL", Retrieved on: Apr. 24, 2013, Available at: http://www.mysugaku.net/documents/Excel%20Tutor/Creating_Interactive_Tutorials_with_EXCELFnl.pdf, 17 pgs.

Arganbright, Deane, "Enhancing Mathematical Graphical Displays in Excel through Animation", Electronic Journal of Spreadsheets in Education, vol. 2, Issue 1, Jan. 5, 2006, 25 pages.

Wischniewsky, Wilfried A.L., "Movie-like Animation with Excel's Single Step Iteration Exemplified by Lissajous Figures", Electronic Journal of Spreadsheets in Education, vol. 3, Issue 1, Oct. 5, 2008, 15 pages.

Fox, et al., "WebFlow based Visual Authoring Tools for HLA Applications", In Proceedings of the International Test and Evaluation Association Workshop on High Performance Computing for Test and Evaluation, Jul. 13, 1998, 8 pages.

"Second Written Opinion Issued in PCT Patent Application No. PCT/US2014/041293", dated Jun. 17, 2015, 8 Pages.

"International Preliminary Report on Patentability Issued in PCT Application No. PCT/US2014/041293", dated Sep. 11, 2015, 9 Pages.

"International Search Report and Written Opinion Issued in PCT Patent Application No. PCT/US2014/041293", dated Feb. 23, 2015, 10 Pages.

* cited by examiner

TELLING INTERACTIVE, SELF-DIRECTED STORIES WITH SPREADSHEETS

BACKGROUND

Spreadsheets are valuable tools for communicating data, status, decisions, and other information. Reducing long and complex calculations or messages into something that is simple, pleasant to look at, and visually engaging is important to help organizations and users understand the information and internalize it in a way that is actionable. While it may be common to show the outcome in a simple and engaging presentation, the supporting data is rarely given the same treatment. Unfortunately, it is often important to present the supporting data to explain how the data was used to reach the outcome, to teach how the spreadsheet works, and/or to provide confidence in the correctness of the outcome.

Many spreadsheets are very complex, fragile, and can be difficult, if not impossible, to understand for anyone but the creator. For this reason, a consumer can have difficulty trusting a spreadsheet unless the author is there to explain the spreadsheet and provide assurance that the data or calculations are correct. It is also common for a consumer working with a spreadsheet created by someone else to have difficulty altering the spreadsheet in order to see how the outcome might differ based on changes in a few variables. One problem for the consumer is knowing which portions of the spreadsheet can be modified without making the results untrustworthy. This magnitude of this problem is often linked to the complexity of the spreadsheet, but can occur even with what appears to be a relatively simple spreadsheet. For example, the creator of a spreadsheet providing a simple mortgage calculator would be aware that the interest rate must change when the loan amount exceeds a certain value (e.g., $506,000). This requirement is likely to be unknown or overlooked by a consumer who just wants to see the monthly loan payment for a $600,000 loan.

Further, given the size and complexity of many spreadsheets and the fact that data and/or filters on supporting sheets often change the outcomes on the "report" sheets, it is difficult to create a visually engaging spreadsheet. One option is for the spreadsheet creator to spend considerable effort attempting to arrange the supporting data in meaningful and/or visually appealing way and to otherwise make the supporting data beautiful to provide a visually compelling flow or experience for the consumer. Typically, the consumer is simply left to wade through a large amount of data on the supporting sheets. Even if the consumer understands the data, the efforts to create a visually engaging spreadsheet (e.g., formatting and hiding sheets with supporting data) may distract from the overall goal of understanding the decision or takeaway of the report and hinder the ability easily modify variables to test for different possible outcomes or generate new reports.

It is with respect to these and other considerations that the present invention has been made. Although relatively specific problems have been discussed, it should be understood that the embodiments disclosed herein should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments described in the present disclosure provide for a spreadsheet storytelling engine that may run in the context of a spreadsheet application on any device, service, or general endpoint capable of running the spreadsheet application. The spreadsheet storytelling engine allows for the authoring and telling of a story. The story allows the spreadsheet to convey visualizations, data, calculations, or other objects in a spreadsheet in a way that helps a consumer understand the information and internalize it in a way that is actionable.

The story is a collection of operations that guide the consumer through a spreadsheet. The available operations include any operation that the spreadsheet application knows how to do. In some embodiments, the story includes additional operations provided by the spreadsheet storytelling engine.

The spreadsheet storytelling engine includes an author mode and a storyteller mode. In author mode, the spreadsheet author records the operations that affect the spreadsheet. The author mode user interface includes controls that allow a user to record a series of operations to create a story and to edit existing stories. The storyteller mode user interface includes navigation controls to navigate through, control the flow of the story, or move to a selected point (e.g., a specific operation, unit, or time) in the story and, optionally, elements that are specific to the storyteller mode user interface.

The story is typically told in the form of a presentation of the operations within in the spreadsheet application and may be either interactive or non-interactive. In various embodiments, the story provides the ability to highlight parts of the spreadsheet at predetermined points in the story, or dynamically based on choices, so the consumer can interact with certain data or controls without exposing all the data by allowing the spreadsheet author to include operations that zoom in on or partially render spreadsheet objects.

The spreadsheet storytelling engine provides navigation controls that allow the consumer to jump to and play portions (e.g., distinct units) of the story. Generally, the distinct units correspond to a series of operations or blocks of time. The distinct units of the story can be annotated, modified, viewed, and saved separately. In other embodiments, navigation is linked to objects in the spreadsheet or controls in the spreadsheet application user interface.

Embodiments of the spreadsheet storytelling engine also allow the spreadsheet author and/or the consumer to add annotations to and save them with the story. The annotations can be linked to one or more operations, spreadsheet objects, or times allowing the annotations to be persistent or contextual.

Support for branching allows the spreadsheet author to specify different sequences of operations linked to a decision or action by a consumer. Embodiments of the story allow the consumer to pause or stop the story, edit the spreadsheet, and optionally continuing the story using the edited spreadsheet. In various embodiments, the spreadsheet storytelling engine and/or the story contain logic for handling error conditions if the consumer modifies the spreadsheet in a way that makes an operation in the story invalid. The consumer may remove the story from the spreadsheet and continue working with the spreadsheet as a standard spreadsheet.

Embodiments of the spreadsheet storytelling engine support collaboration across a network allowing multiple consumers to interact with the story in real time. Collaboration also provides for real time communication between and voting by the collaborative consumers. In some embodiments, the spreadsheet storytelling engine allows the conversation and/or voting results to be recorded and stored. Some embodiments of the spreadsheet storytelling engine support collaboration during authoring allowing multiple spreadsheet authors to collaboratively work on a single story and communicate in real time. Similarly, some embodiments of the spreadsheet storytelling engine allow the consumer to initiate communication with a remote person at any point in the story without losing context of where the consumer is within the story. In some embodiments, the spreadsheet storytelling engine allows the conversation and/or voting results to be recorded and stored with the story and/or spreadsheet.

In some embodiments, records of viewing, usage, responses, and other actions may be recorded and permanently saved with the story and/or spreadsheet file to provide a history that can be used in auditing or compliance scenarios. In some embodiments, providing such approval or disapproval also locks the response, story, and/or spreadsheet to provide a permanent record of the decision and, optionally, the identity of the decision maker.

In some embodiments, the spreadsheet storytelling engine communicates with one or more remote services. These remote services may offer storage/distribution, monetization, and rating services for stories, story updates, and spreadsheets, as well as, compatibility verification services, story and/or spreadsheet update services, advertising services, collaboration services, and data collection services for collecting metrics on the usage and/or usability of stories and/or features.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Embodiments of a spreadsheet storytelling engine are described herein and illustrated in the accompanying figures. The spreadsheet storytelling engine may run in the context of a spreadsheet application on any device, service, or general endpoint capable of running the spreadsheet application. The spreadsheet storytelling engine allows for the authoring and telling of a story. The story allows the spreadsheet to be used to convey visualizations, data, calculations, or other objects in a spreadsheet in a way that may be simple, beautiful to look at, and/or visually engaging to help a consumer understand the information and internalize it in a way that is actionable without requiring the real time availability of the spreadsheet author. The spreadsheet storytelling engine is useful for purposes including, but not limited to, making presentations, creating tutorials, validating data, explaining how a model works, and generating interactive business intelligence dashboards.

Figure 1:
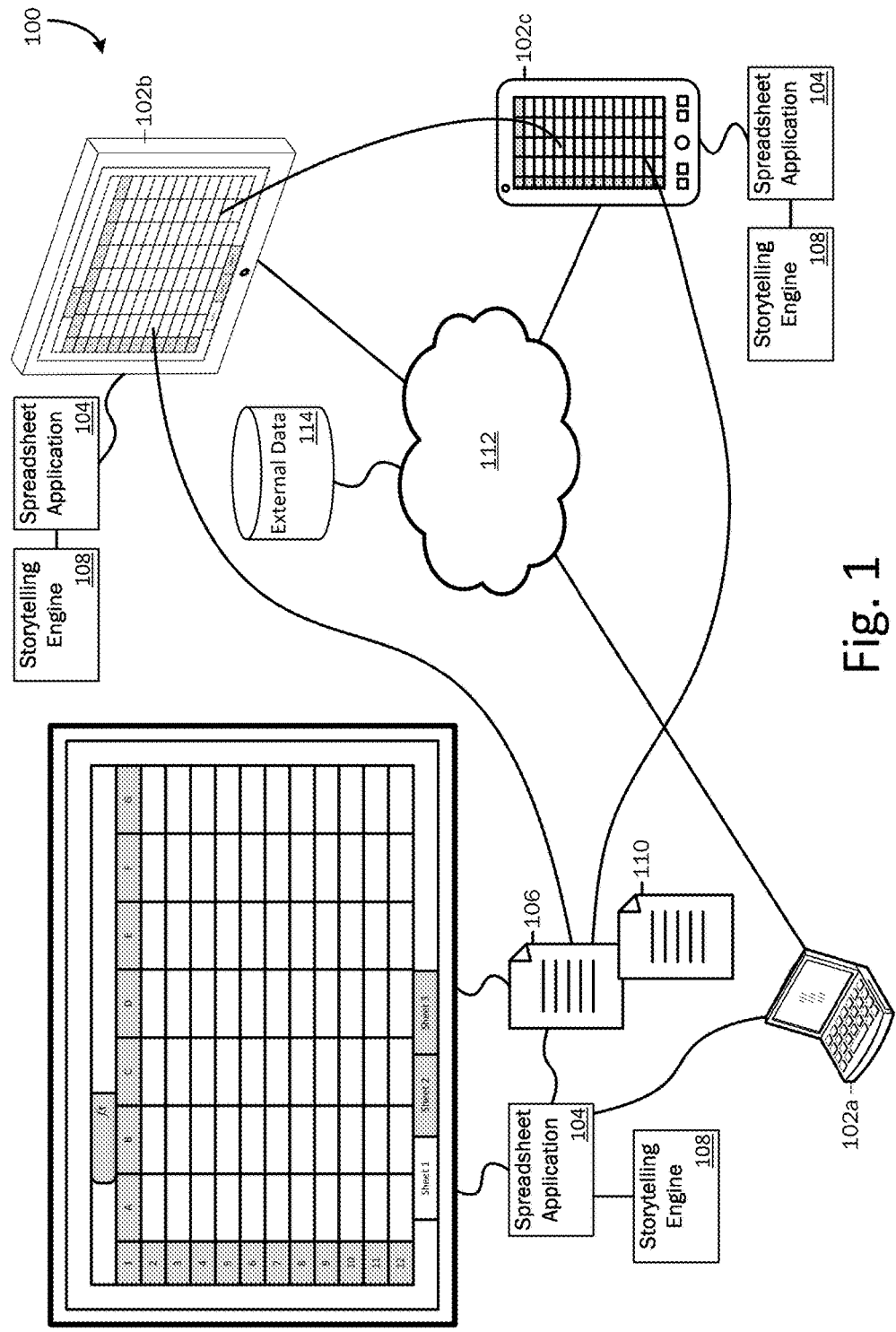
FIG. 1 illustrates one embodiment of a system including the spreadsheet storytelling engine.

FIG. 1 illustrates one embodiment of a system including the spreadsheet storytelling engine. The system 100 includes one or more computing devices such as personal computer (e.g., a desktop or laptop computer) 102a, a tablet computer 102b, and a smart phone 102c. Each of the computing devices runs a spreadsheet application 104 for displaying and editing a spreadsheet 106. Each of the computing devices also runs a spreadsheet storytelling engine 108 that may be integrated into the spreadsheet application 104 or run as a separate application interoperating with the spreadsheet application 104. The spreadsheet 106 has an associated story 110 that may be part of the spreadsheet file or saved as a separate file. The computing devices are connected to a network 112 (e.g., an intranet or Internet). The illustrated embodiment also shows an external data source 114 that may be linked to and provide data to the spreadsheet 106.

The story 110 is a collection of operations that the spreadsheet application and/or the spreadsheet storytelling engine can perform and may be used to guide the consumer through the spreadsheet 106. Examples of suitable operations include, but are not limited to, data entry, navigation between spreadsheet objects (e.g., sheets, cells, or ranges), changing between an object only view or a sheet/canvas view, selection, deletion, insertion, sorting, filtering, expanding, collapsing, renaming, drilling through the data, applying formatting styles, and removing formatting styles.

Figure 2:
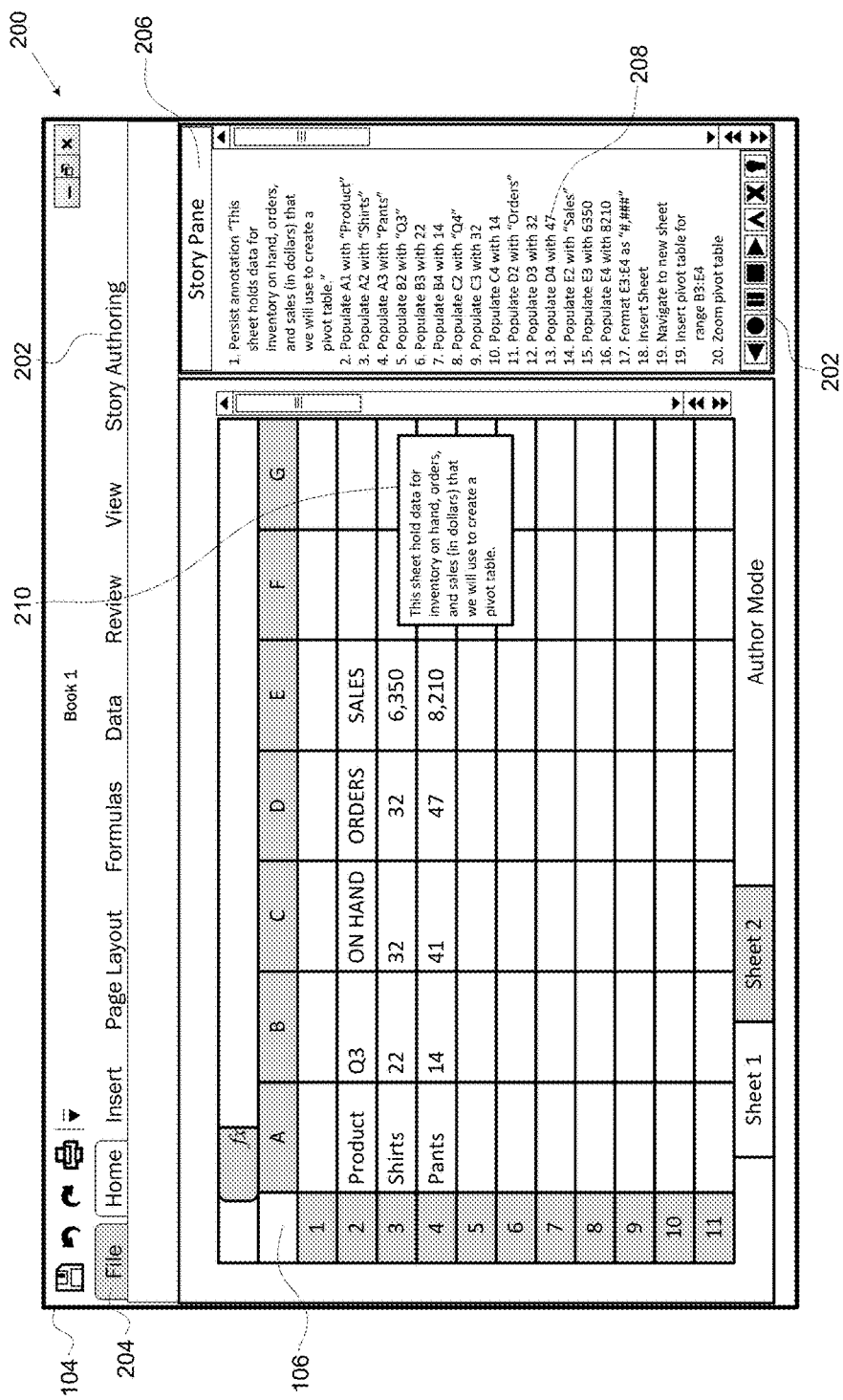
FIG. 2 illustrates one embodiment of the spreadsheet storytelling engine in author mode.
Figure 3:
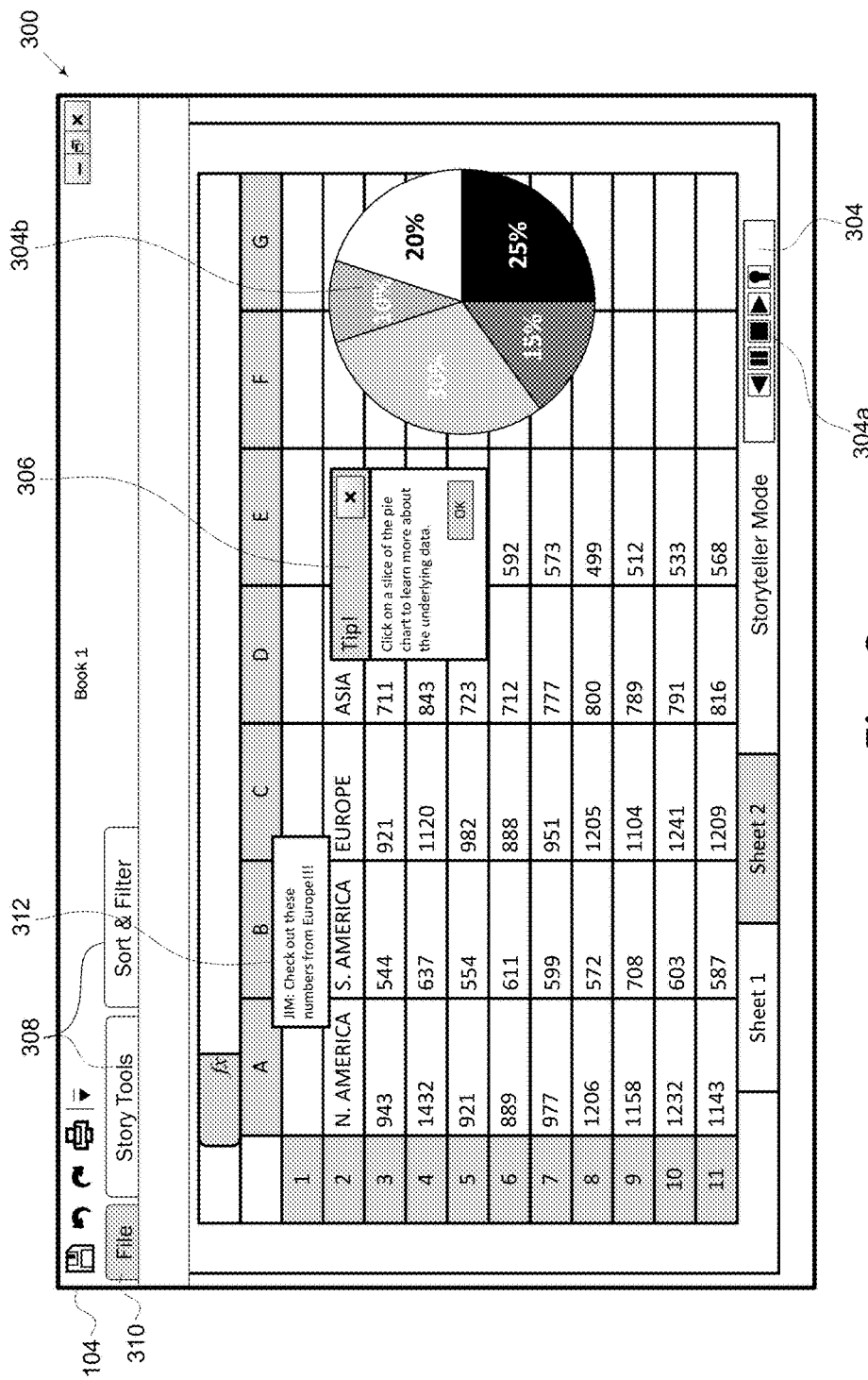
FIG. 3 illustrates one embodiment of the spreadsheet storytelling engine in storytelling mode.
Figure 4:
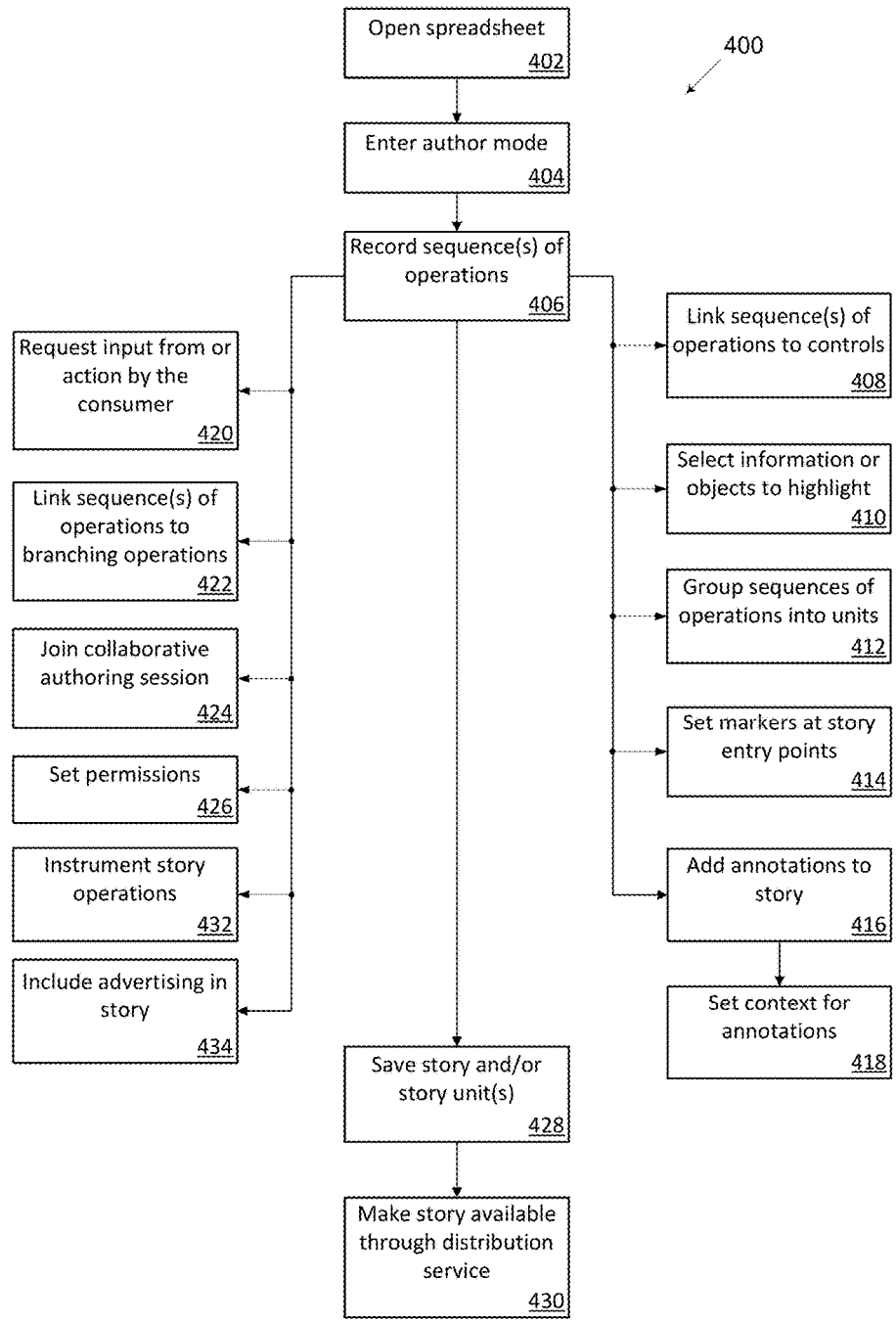
FIG. 4 illustrates one embodiment of a method for authoring a story using the spreadsheet storytelling engine.
Figure 5:
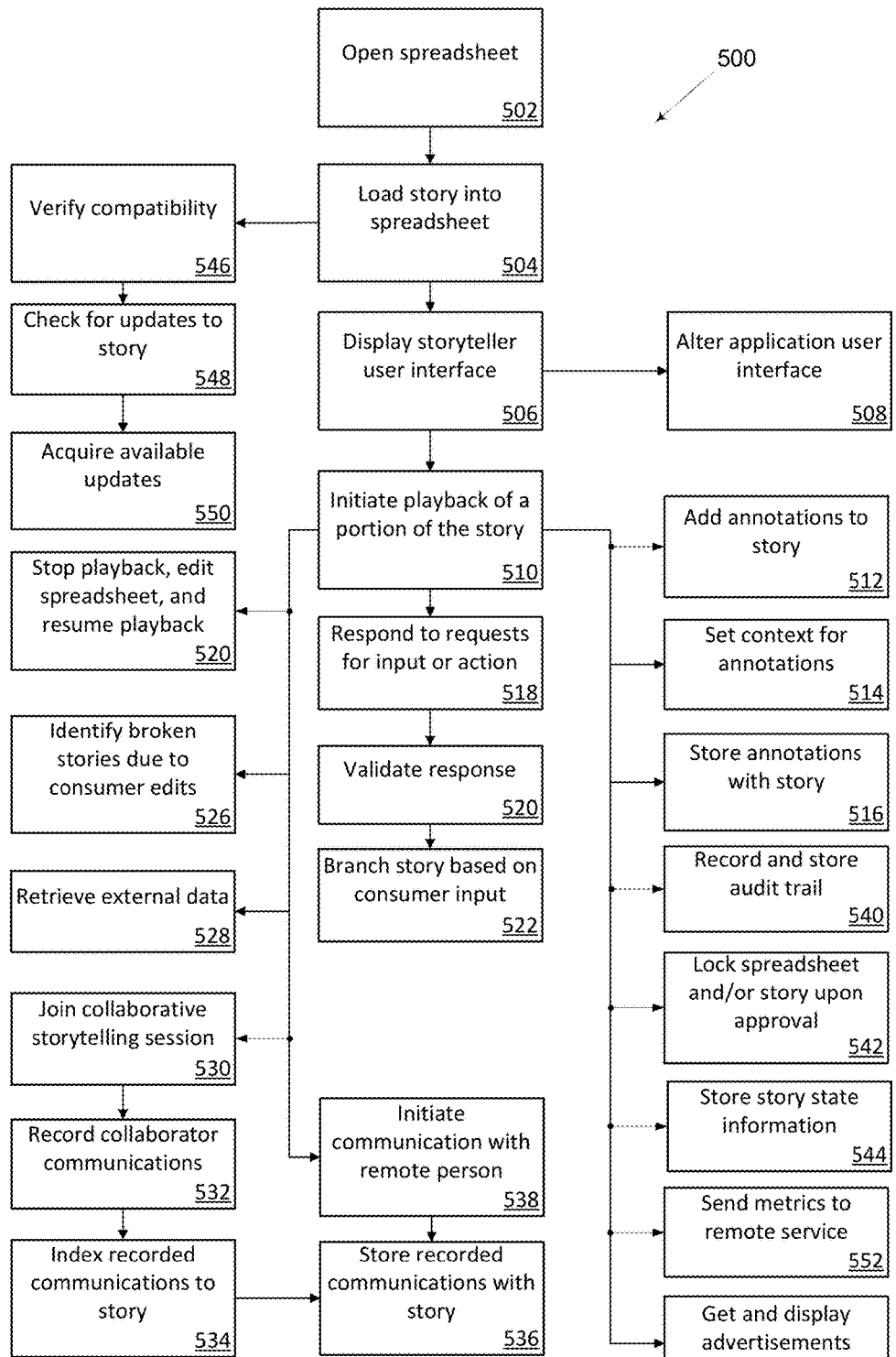
FIG. 5 shows one embodiment of a method for telling a story using the spreadsheet storytelling engine.

The spreadsheet storytelling engine includes an author mode 200 and a storyteller mode 300, embodiments of which are shown in FIGS. 2 and 3, respectively. FIG. 4 shows one embodiment of a method 400 for authoring a story using the spreadsheet storytelling engine. FIG. 5 shows one embodiment of a method 500 for telling a story using the spreadsheet storytelling engine.

Authoring begins by opening 402 a spreadsheet and entering 404 author mode. In author mode, the spreadsheet author records 406 a collection of one or more sequences of the operations that affect the spreadsheet or the outcome of the story. Authoring of a story for a spreadsheet 106 can occur at any time. In other words, the story may be authored as the spreadsheet is being created and/or once the spreadsheet is finished. The author mode user interface 200 includes controls 202 that allow a user to record a series of operations to create a story and to edit existing stories (e.g., insert, delete, or annotate). Some of the authoring controls may be added to the default spreadsheet application user interface 204 (e.g., command bars and chrome). In the illustrated embodiment, the author mode user interface 200 includes a task pane 206 that lists the collection of operations 208 that make up the story. In various embodiments, the author mode user interface also includes some or all of the controls of the storyteller mode user interface.

Storytelling is the playback of the story. Storytelling begins by opening 502 a spreadsheet, loading 504 the associated story, and displaying 506 the storyteller mode user interface 302. The storyteller mode user interface 300 may be automatically displayed when the story is loaded or may only be displayed after storyteller mode is selected by the consumer (story playback is initiated) 510. The storyteller mode user interface 300 includes navigation controls 304 to navigate through, control the flow of the story, or move to a selected point (e.g., a specific operation, unit, or time) in the story. In various embodiments, the navigation controls include playback controls 304a such as buttons that allow a user to play, stop, pause, rewind, or fast forward the story.

In some embodiments, the navigation controls are provided using the storyteller mode (or author mode) user interface. In other embodiments, navigation is linked 408 to objects in the spreadsheet or controls in the spreadsheet application user interface 204. For example, applying a filter using the spreadsheet application controls or selecting a certain part of a chart or image in the spreadsheet would navigate to a specific location in the story. For example, the navigation controls 304 include any of, but are not limited to, scroll bars, scrub bars, slider controls, spin controls, hot key controls, menu bars, pagination controls, image map controls, spreadsheet controls (e.g., graphs or tables), and flick or gesture based controls. In the illustrated embodiment, the pie chart 304b is a spreadsheet control that also serves as a navigation control 304. Each slice of the pie is linked to a sequence of operations in the story. Selecting a slice of the pie branches the story to the corresponding sequence of operations. For example, the corresponding operation sequences may explain, provide additional analysis of, or highlight the underlying data (typically corresponding to that slice of the pie). The storyteller mode user interface 300 optionally includes elements that are specific to the storyteller mode user interface. For example, the storyteller mode user interface may include a dialog box 306 to allow a consumer to choose a predefined scenario in the story, a title screen, an instructional screen, and a credit screen.

The storyteller mode user interface 300 may include a viewing mode user interface 308 that alters 508 the default spreadsheet application user interface 204 to make it easier to view or interact with the story. For example, viewing mode user interface may consolidate the controls used by the story 308 (e.g., the sorting, filter, navigation, and playback controls) into a single group. In some embodiments, the viewing mode user interface removes or hides elements of the spreadsheet application user interface (e.g., command bars and chrome) not used by the story. In the illustrated embodiment of FIG. 3, portions of the spreadsheet application user interface 310 are hidden except for the sort and filter controls and some other tools that are used by the story. In some embodiments, the viewing mode user interface alters the spreadsheet application user interface to make the spreadsheet application appear more like a flip book, movie, or other type of storytelling vehicle. The storyteller mode user interface optionally includes a presentation mode user interface similar to the viewing mode user interface but optimized for making a presentation.

In various embodiments, the story includes functionality that focuses the view on (i.e., highlights) selected information or objects in the spreadsheet to aid the consumer during playback. The spreadsheet author may select 410 to zoom in on or partially render objects (e.g., part of a larger range of tabular data or a portion of a graph) during story authoring. The highlighting functionality provides the ability to show parts of the spreadsheet at predetermined points in the story, or dynamically based on choices, so the consumer can interact with certain data or controls without exposing all the data. For example, upon asking the consumer to filter a table, the story may show just a filtered table view instead of showing the entire table associated with the filter. In this case, the filter choice and the effect on the object or the data on screen is the important information that the spreadsheet author wants to communicate to the consumer rather than presenting the full table where the filter is applied (which could be thousands of rows long). The highlighting functionality may use the same core rendering path of the spreadsheet application and manipulate the view port or may support separate viewing areas within the viewport.

In various embodiments, the story is told in the form of a presentation of the operations within in the spreadsheet application and may be either interactive or non-interactive. The story is not limited to linear playback. The spreadsheet storytelling engine provides navigation controls that allow the consumer to jump to and play portions of the story identified by markers (e.g., frame or chapter markers). In some embodiments, the story author groups 412 sequences of operations into distinct story units. Generally, the distinct units correspond to a series of operations (e.g., the first 10 operations or the first two navigations) or blocks of time (e.g., the first five minutes). In some embodiments, distinct story units are identified 414 with markers that represent entry points into the story at the corresponding story unit. Using markers to index or group the story into distinct units allows the spreadsheet author to identify points in the story where viewing can begin without missing some relevant choice, action, or information. Further, the distinct units of the story can be annotated, modified, viewed, and saved separately.

Embodiments of the spreadsheet storytelling engine allow the addition 416 of story author annotations 210 and, optionally, the addition of 512 of consumer annotations 312 to the story. The spreadsheet storytelling engine allows annotation of any operation. Annotations may be in any format including, but not limited to, video, audio, ink, and text. In some embodiments, the annotations are added using existing spreadsheet operations (e.g., spreadsheet application comment functionality). In other embodiments, the annotations are added using features provided by the spreadsheet storytelling engine. The annotations added by the consumer may be used to record alternate explanations for, reactions to, and approvals or rejections of the outcome of all or part of the spreadsheet or the results of one or more operations in the story. In some embodiments, the consumer has the option to turn annotations added by other consumers on or off. In some embodiments, the consumer has the option to turn all annotations (including those added by the spreadsheet author) on or off.

The annotations can be linked to one or more operations, spreadsheet objects, or times allowing the annotations to be persistent or contextual. Persistent annotations are always visible (unless hidden) while contextual annotations are only visible in certain contexts. For example, an annotation added to cell A3 during operation seven of the story may only be visible at the start of, end of, or during playback of operation seven of the story. Alternatively, an annotation may be configured to only be visible when selected criteria are met (e.g., the value of cell A3 is >100) or the annotated cell is selected. The annotations are stored with metadata that instructs the spreadsheet application when to display the annotation. In some embodiments, the annotations are stored in the story in the appropriate contextual position (i.e., with operation seven). In other embodiments, the annotations are stored in a separate story or stream that is indexed to (e.g., using time stamps or operation identifiers) and runs synchronously with the story. The context for the annotation may be set 418, 514 by the annotator (i.e., the story author or consumer) or programmatically by the spreadsheet storytelling engine based on the state of the story. The annotations made by consumers may also be saved 516 with the story and may optionally be distributed to other consumers via a remote service.

The spreadsheet author may include operations to make requests 420 (e.g., ask the consumer to respond or do something) at selected points in the story. For example, the story may ask the consumer to apply a filter to the data (i.e., make a selection) or to indicate when the consumer is ready to continue the story (i.e., click a "next" button). The consumer may respond 518 to the request to provide information, see the result, or otherwise continue the flow of the story. The story also allows the story to validate 520 a response from the consumer. Validation can take the form of simple data validation of an input (e.g., verifying the input is a number or in a proper date format) or verification that an action taken by the consumer was of the type expected. For example, if the story requested the consumer to apply a filter but the consumer attempted to perform some other action, the story would provide a notification to the consumer. In some embodiments, the story would block the non-conforming action.

Embodiments of the story support linking 422 sequences of operations to as events like consumer responses, outcomes, and the values obtained from such events (i.e., branching operations). Branching allows the story to play 522 different sequences of operations linked to a decision or action by consumer. The different branches may be used to provide analysis of different "what-if" scenarios. For example, the story may include a first sequence of operations that execute if a filter is a set to a first value and a different sequence of operations that execute if the filter is a set to a second value. A variation of branching supports the definition of broad scenarios (e.g., good, better, best) that impact how the story is told.

Embodiments of the story allow the consumer to pause or stop playback of the story, edit the spreadsheet (e.g., changing formulas and adding or removing data), and optionally continue the story using the edited spreadsheet 520. In various embodiments, the spreadsheet storytelling engine and/or the story contain logic for handling error conditions 526 if the consumer modifies the spreadsheet in a way that makes the next operation in the story invalid (i.e., breaks the story). In such a case, the story may display an error message, skip the invalid operation and continue to the next operation, or simply fail and exit the story. Further, the spreadsheet storytelling engine allows the consumer to stop the story, remove the story from the spreadsheet, and continue working with the spreadsheet as a standard spreadsheet without any associated story.

Embodiments of the story support linking to an external data source 114. When linked to an external data source, the story gives the consumer the option to use the existing data in the spreadsheet or to update (i.e., refresh) the data 528 on a per link or per data source basis. In some embodiments, the story automatically updates the data. In other embodiments, the story proceeds based on a default (e.g., using existing data with an optional explanation of how to update the data) and the user must manually refresh the data, if desired.

Embodiments of the spreadsheet storytelling engine support collaboration across a network 112 as shown, for example, in FIG. 1. Collaboration allows multiple consumers to join 530 a collaborative storytelling session and to interact with the story in real time. In some embodiments, the story 110 would progress for all collaborating consumers based on the choice or action one of the consumers rather than requiring each of the consumers to make a choice or perform an action. In other embodiments, certain operations may require responses from each of the collaborating consumers. Changes to the data or resulting from the choice or action of one consumer would be seen by all of the consumers. Some embodiments allow responses to be made public to or kept private from some or all of the collaborating consumers. For example in a collaborative multi-department budget meeting with an executive in charge of all of the departments, each department representative might enter budget figures that are viewable only by the executive but not shared with the other department representatives.

Collaboration also provides for real time communication between and voting by the collaborative consumers. For example, the story can include a polling question that can/must be answered by the consumers viewing a presentation of the story. In some embodiments, the spreadsheet storytelling engine allows the conversation and/or voting results to be recorded 532. Various embodiments index 534 the recorded information to the story allowing synchronized playback of the recorded information with the story. In some embodiments, the recorded information is treated as an annotation. The recorded information may be integrated into and stored 536 with or separately from the story. Some embodiments of the spreadsheet storytelling engine support collaboration during authoring allowing multiple spreadsheet authors to join a collaborative session 424 and work together on a single story and communicate in real time. Examples of suitable forms of communication include instant messaging (i.e., chat), e-mail, streaming video/audio, social networking, texting, and other forms of modern social communication integration.

Embodiments of the spreadsheet storytelling engine allow the consumer to initiate communication 538 with a remote person at any point in the story without losing context of where the consumer is within the story. In various embodiments, the remote person includes any user or community capable of receiving the communication request (e.g., the spreadsheet author). Such communications may also be stored as described above.

Embodiments of the spreadsheet storytelling engine support setting permissions 426 by the spreadsheet author to control rights to one or more of the story, the spreadsheet associated with the story, and/or portions of the story or the spreadsheet including, but not limited to, objects, operations, and branches. By controlling the rights, the author may limit the ability of the consumer to perform actions such as, but not limited to, modifying or copying the spreadsheet or the story, adding or deleting consumer annotations, moving non-linearly through the story, and disassociating the story from the spreadsheet. The permissions may be role or identity based allowing consumers to see different stories or values in the stories based on their role or identity.

Records of viewing, usage, responses, and other actions may be recorded and permanently saved with the story and/or spreadsheet file to provide a history that can be used in auditing or compliance scenarios (i.e., recording and storing an audit trail) 540. Such records may be made available to auditing and compliance algorithms, software products, or other governing bodies or processes. Further, a response or annotation may be may be recorded and saved with the story and/or spreadsheet file to provide a record of approval or disapproval of the data, decision, or outcome. In some embodiments, providing such approval or disapproval also locks 542 responses, the story, the spreadsheet, or any combination thereof to provide a permanent record of the decision and, optionally, the identity of the decision maker, which may be useful in an auditing or compliance scenario.

The story may be told in the form of a viewable movie (i.e., a non-interactive presentation). In some embodiments, the story movie exported to a video or multimedia file hat can be viewed using any device supporting the movie file format without the need for the spreadsheet application to be available. In an auditing or compliance scenario, saving a story as movie provides a record that is effectively permanent, non-modifiable, and does not rely on future availability of a story compatible spreadsheet application.

The story can be saved 428 as part of a spreadsheet or as a separate file that can be loaded into a spreadsheet. Once saved the story may be distributed 430 to consumers. This enables the consumer to download just the story without the spreadsheet file. This allows monetization of the story as a separate entity and reduces the download size. Some embodiments of the story are vendor and/or application independent. In other words, the story is compatible with many spreadsheet file formats from various spreadsheet application vendors. This increases the value of story for monetization purposes as the spreadsheet author is not limited by the spreadsheet application used by the author and/or is not required to created version specific spreadsheet stories for a multitude of spreadsheet applications.

In some embodiments, the story is saved as records in a spreadsheet file format. Records are created for each operation that makes up the story. Using the spreadsheet file format leverages existing descriptors of state in the file format (e.g., revision records). Alternatively, new state descriptors specific to the spreadsheet storytelling engine may be created. Among the uses, the state descriptors allow the spreadsheet storytelling engine to save the current state 544 of where the story is (i.e., progress or completion). The state may be updated and saved when the story is stopped, paused, or closed or after each operation. This allows the consumer to resume at or near where an incomplete story was interrupted (e.g., by a power failure or application crash). Additionally, the state descriptors may be used by the author to define different places where the story may start.

A story generated in one spreadsheet file can be applied to a different spreadsheet file. For example, a story teaching how to create a pivot table based on native data in a spreadsheet might include the following operations. The first part of the story may include operations populate data corresponding to a first product identifier (e.g., "shirts") into cell A2, populate data (e.g., 23) relating to the first product into cell B2. This data may represent inventory or units sold). Subsequent operations in the first part of the story would populate the spreadsheet with additional product identifiers and related data to fill cells A2:D59. The story may further include operations to the make the range A2:D59 into a table, name the table "products". The second part of the story may include operations to insert a new sheet insert into the spreadsheet, show annotations explaining how to select the data range to be included in the pivot table, insert a pivot table on the new sheet based on the "products" table.

An alternate version of the story teaching how to create a pivot table based on native data in a spreadsheet might include the following operations in the second part of the story to make it more general. The second part of the story may include operations to show annotations explaining how to select a range of tabular data to be included in the pivot table, ask the consumer to select the range of tabular data to be included in the pivot table, insert a pivot table on the new sheet based on the range selected by the consumer, and run pivot table layout suggestion code in the spreadsheet application. The consumer would then be able to create a custom range of tabular data and play only the second part of the story to create the pivot table based on the custom range.

Multiple spreadsheet stories may be associated with a single spreadsheet file. Referring once again to the simple example of the story teaching how to create a pivot table based on native data in a spreadsheet, the different parts of the story might be saved as two different spreadsheet stories. One consumer might need to add both the first story (i.e., the first part) showing how to create a data table in the spreadsheet and the second story showing how to create the pivot table using the data table created during playback of the first story. A different consumer who knows how to create a data range might need to add only the second story showing how to create the pivot table.

In some embodiments, the spreadsheet storytelling engine 104 communicates with one or more remote (e.g., local area network, Internet, or cloud based) services, as illustrated in FIG. 8. These remote services may offer storage/distribution 840, monetization 842, and rating 844 services for stories, story updates, and spreadsheets; compatibility verification services 846, story and/or spreadsheet update services 848, advertising services 850, collaboration services 852, and data collection services 854 collecting metrics on the usage and/or usability of stories and/or features (e.g., from operation instrumentation). In various embodiments, a story or a particular operation in a story (e.g., a polling operation) may be instrumented 432 to communicate information to a selected remote service in addition to or in lieu of storing the information with the story or spreadsheet file.

The story and/or the spreadsheet may include metadata allowing the spreadsheet storytelling engine to verify that a story is compatible 546 with the spreadsheet and/or with other stories associated with the spreadsheet. Compatibility verification may be premised on criteria including, but not limited to, the version (e.g., release number) of the spreadsheet application, spreadsheet storytelling engine, and/or the story; the model (e.g., "Full", "Lite", "Standard", or "Professional") of the spreadsheet application and/or spreadsheet storytelling engine; the availability of required operations or functionality in the spreadsheet application and/or the spreadsheet storytelling engine; the presence of certain objects in the spreadsheet; the availability of data connections or specific data connections; or the association of a conflicting story with the spreadsheet. In some embodiments, compatibility verification is implemented by programmatically running through the story and see if any errors are encountered.

The story may include metadata allowing the spreadsheet storytelling engine to check for updates 548 or additions to the story available from a remote story provider. For example, the stories can be improved (e.g., functionality added or improved and bugs fixed) or continued (e.g., componentized as "chapters"). In some embodiments, additional downloadable content that supplements or expands the base story is made available as an optional update that may be monetized separately from the base story. The spreadsheet storytelling engine may notify the consumer that a story update is available. In other embodiments, the spreadsheet storytelling engine automatically obtains (e.g., downloads) 550 the updated story for use with the spreadsheet.

Rating services allow consumers to rate, review, or comment on a particular service and share experiences, approval, or dislike of a story. In some embodiments, the rating services also provide useful metrics on the number of time a particular story has been downloaded allowing consumers to identify popular stories.

Data collection 552 of the usability of stories allows the spreadsheet storytelling engine to report which parts of a story that consumers struggle with the most providing valuable insight to the story author. Usability may be measured by various criteria including, but not limited to, an excessive amount of clicks by the consumer during some story part, the amount of time on various story parts, and the number of communications requests (e.g., questions asked) for various story parts.

Embodiments of the spreadsheet storytelling engine support spreadsheet stories that span multiple spreadsheet files. The spreadsheet storytelling engine loads, unloads, displays, and hides spreadsheet files as required by story in the same process as the spreadsheet application. Further, each linked spreadsheet file may have an associated story that begins playing when the master story loads the associated spreadsheet. When the subordinate story ends, playback of the master story resumes.

Further, some embodiments support getting and displaying advertising 554 during story playback. Advertisements may be served to the spreadsheet storytelling engine from a remote advertising service. Advertising can be integral to the spreadsheet storytelling engine or can be linked 434 to the story and displayed to the consumer. Different ads can be displayed to users in the spreadsheet application based on various criteria such as the identity or role of the consumer, the permissions, the data in the spreadsheet, the operations in the story, the choices or navigations by the consumer, and other story elements. Allowing advertising permits monetization scenarios where ad supported versions of spreadsheet stories are available to a consumer at no cost. Alternatively, the consumer can purchase ad free versions of the story or a key to remove the advertisements from the ad supported version.

Figures 6A, 6B:
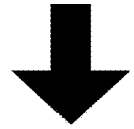
FIGS. 6A-6G illustrates an example spreadsheet story associated with a parent assisting a child in deciding on a college to attend.

For purposes of illustration, the following is an example spreadsheet story associated with a parent assisting a child in deciding on a college to attend. Referring now to FIG. 6A, a parent may utilize a spreadsheet 106 and enter author mode 200 to record a collection of sequences of operations to tell a story of selecting a college. As the child navigates through the story, the first sheet may include a listing of the top 100 colleges 602 in the United States as illustrated in FIG. 6A.

The parent may copy a listing of the top colleges 602 and rankings data associated with the top colleges into the spreadsheet 106.

A next operation in the flow of the story as illustrated in FIG. 6B may be a filtering of the top 100 colleges 602 by region. For example, the parent may only want for the child to attend a school in the southeast region of the United States. FIG. 6B shows the top 100 colleges 602 filtered to schools in the southeast United States 604. The parent may add an author annotation 210 to the story. For example and as illustrated, the parent may add a comment (e.g., video, audio, or text) to the story such as an explanation of the operation performed (e.g., the filtering of the top 100 schools to schools in the southeast).

Figures 6C, 6D:
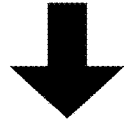

The next operation in the story and as illustrated in FIG. 6C may be another filtering operation, where the parent may choose to filter the list of the top schools in the southeast United States 604 by tuition cost. For example, the parent may have a certain budget planned for the child's education expenses, and may not be able to afford a school with a tuition cost of more than $25,000 per year. Accordingly, the spreadsheet 106 shown in FIG. 6C shows a listing of those schools in the top 100 list, in the southeast, and with a tuition cost of less than $25,000 per year 606. Again, the parent may add an author annotation 210 to the story, explaining why the operation to filter schools by tuition cost was performed.

Figures 6E, 6F:
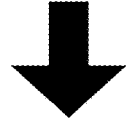

The story may progress to a next operation, where the parent filters the list to schools that have an accredited program in an area of study in which the child wants to major. FIGS. 6D and 6E show the list filtered by two areas of study. For example, FIG. 6D shows the list filtered to schools with an accredited Industrial Engineering program 608, and FIG. 6E shows a list filtered to schools with an accredited Environmental Science program 610.

The child may have an interest in playing a certain sport, for example, golf, but may not plan to play on a varsity team. A next operation in the story may include filtering the list to those schools with an accredited Industrial Engineering program 608 and those schools with an accredited Environmental Science program 610 which also have a non-varsity golf team 612 as illustrated in FIG. 6F. Again, the parent may include an author annotation 210 to the story to explain the operation performed.

Figure 6G:
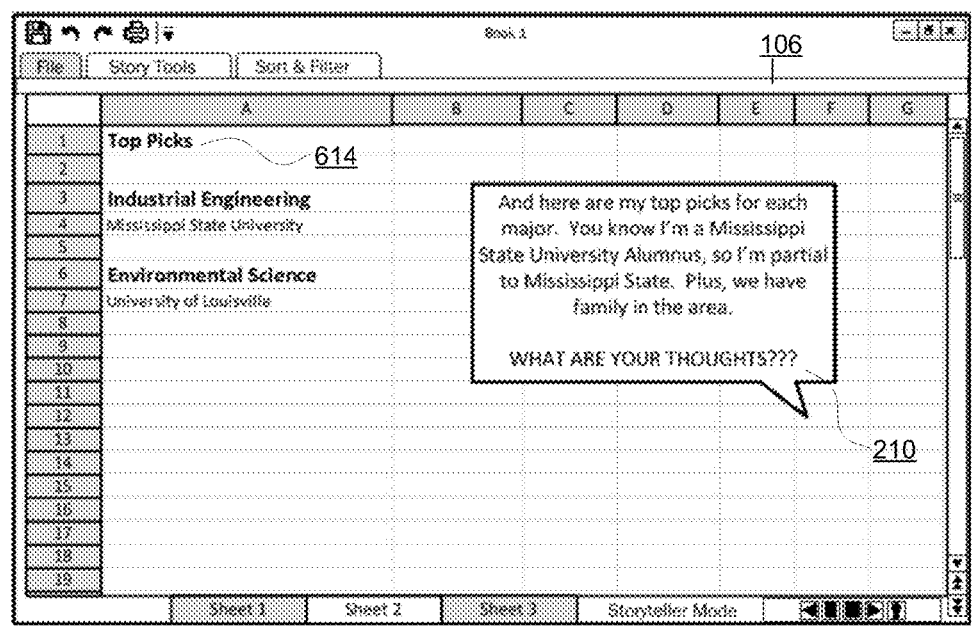

The parent may conclude the story by narrowing the list down to a top picks list 614 as illustrated in FIG. 6G. The parent may add an author annotation 210 explaining his choice. He may also include functionalities allowing the child to insert questions, comments, or to make his own selections to filter the list of the top 100 colleges 602. As should be appreciated, the foregoing description and illustration with reference to FIGS. 6A-6G is for purposes of example and illustration only and is not exhaustive of the vast number of spreadsheet stories that may be generated according to embodiments of the present invention.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
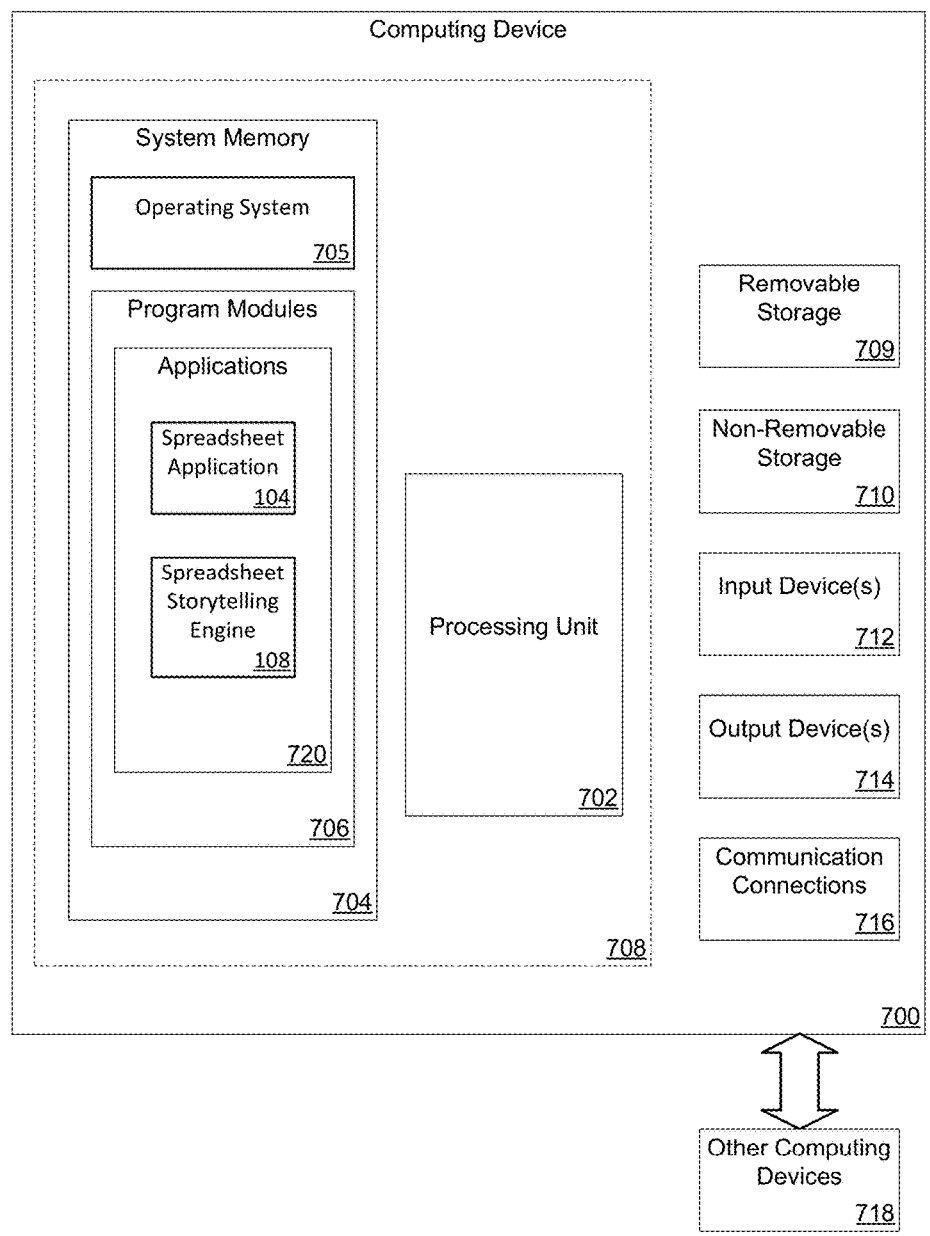
FIG. 7 is a block diagram illustrating one embodiment of the physical components of a computing device with which embodiments of the invention may be practiced.
Figure 8A:
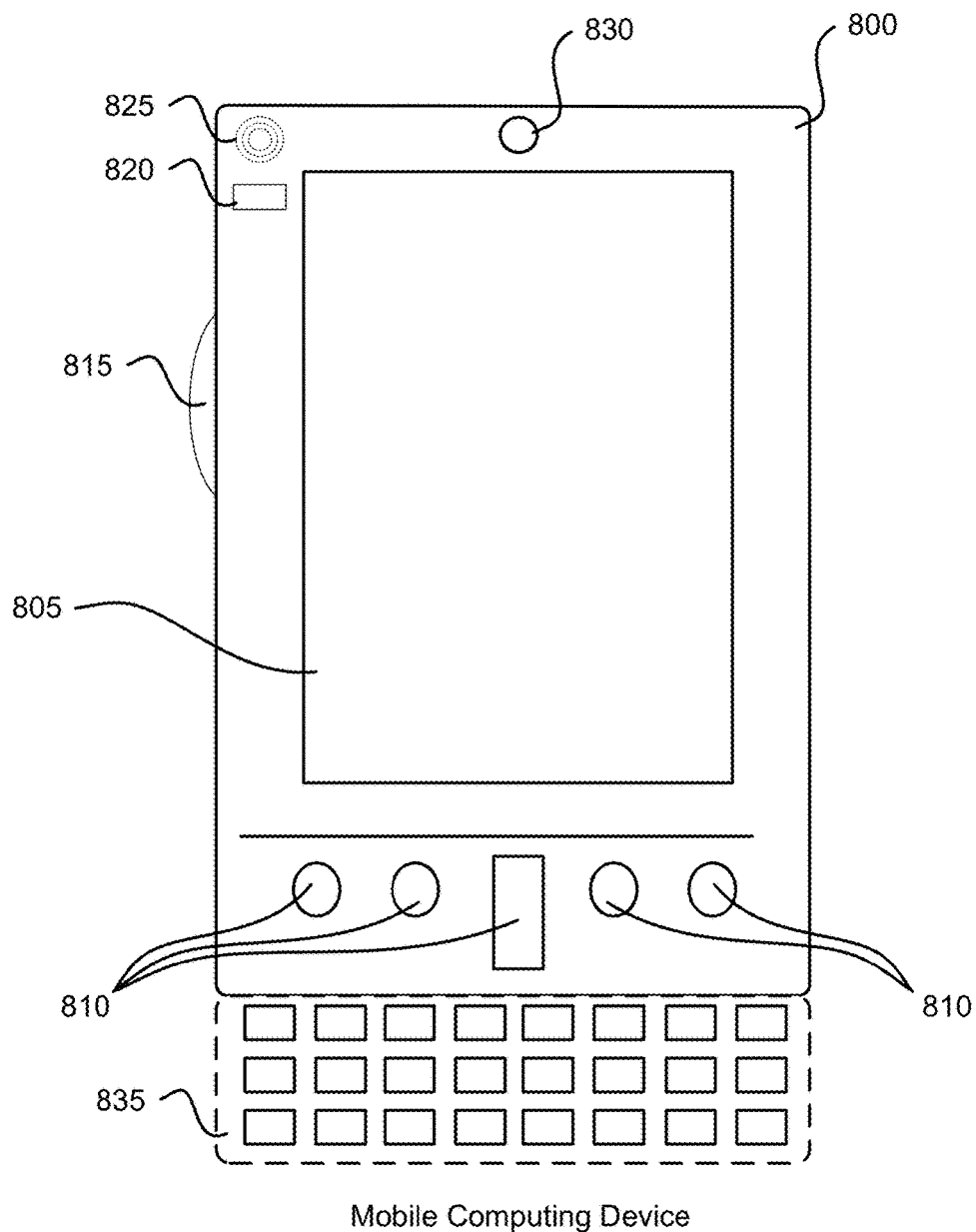
FIGS. 8A and 8B are simplified block diagrams of a mobile computing device with which embodiments of the present invention may be practiced.
Figure 8B:
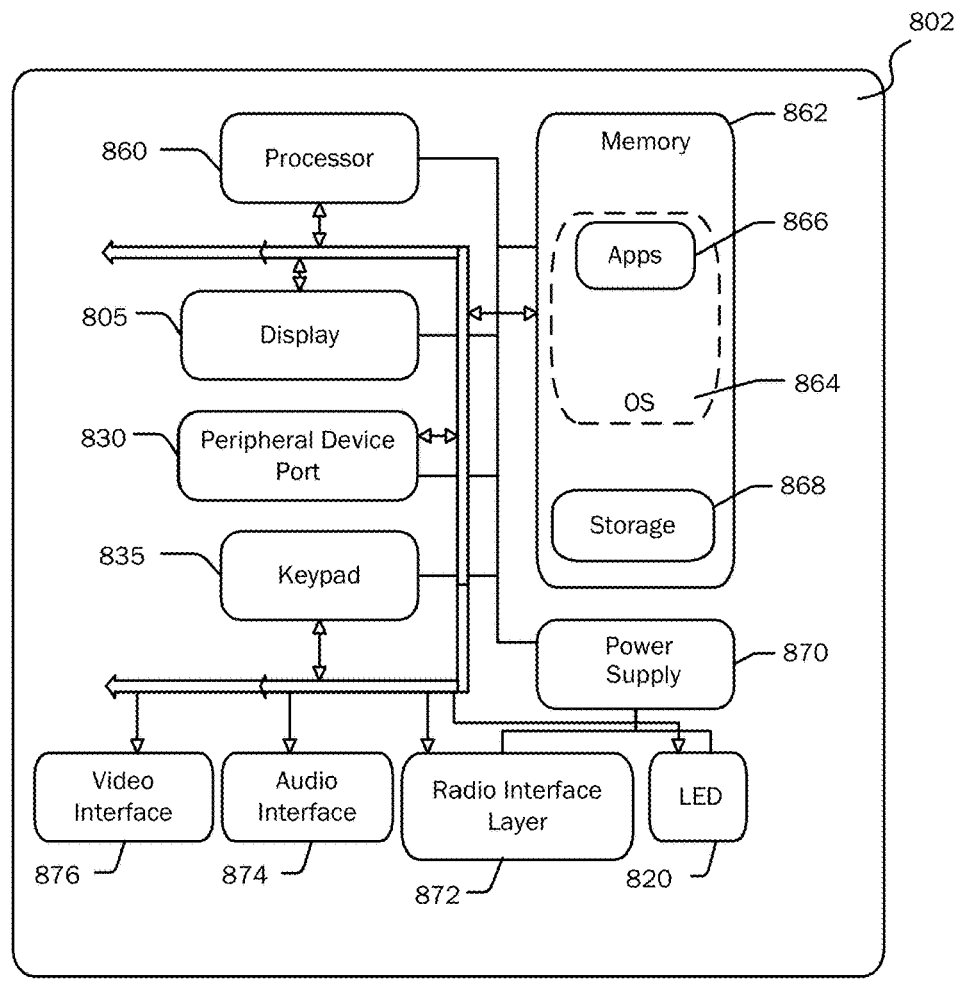
Figure 9:
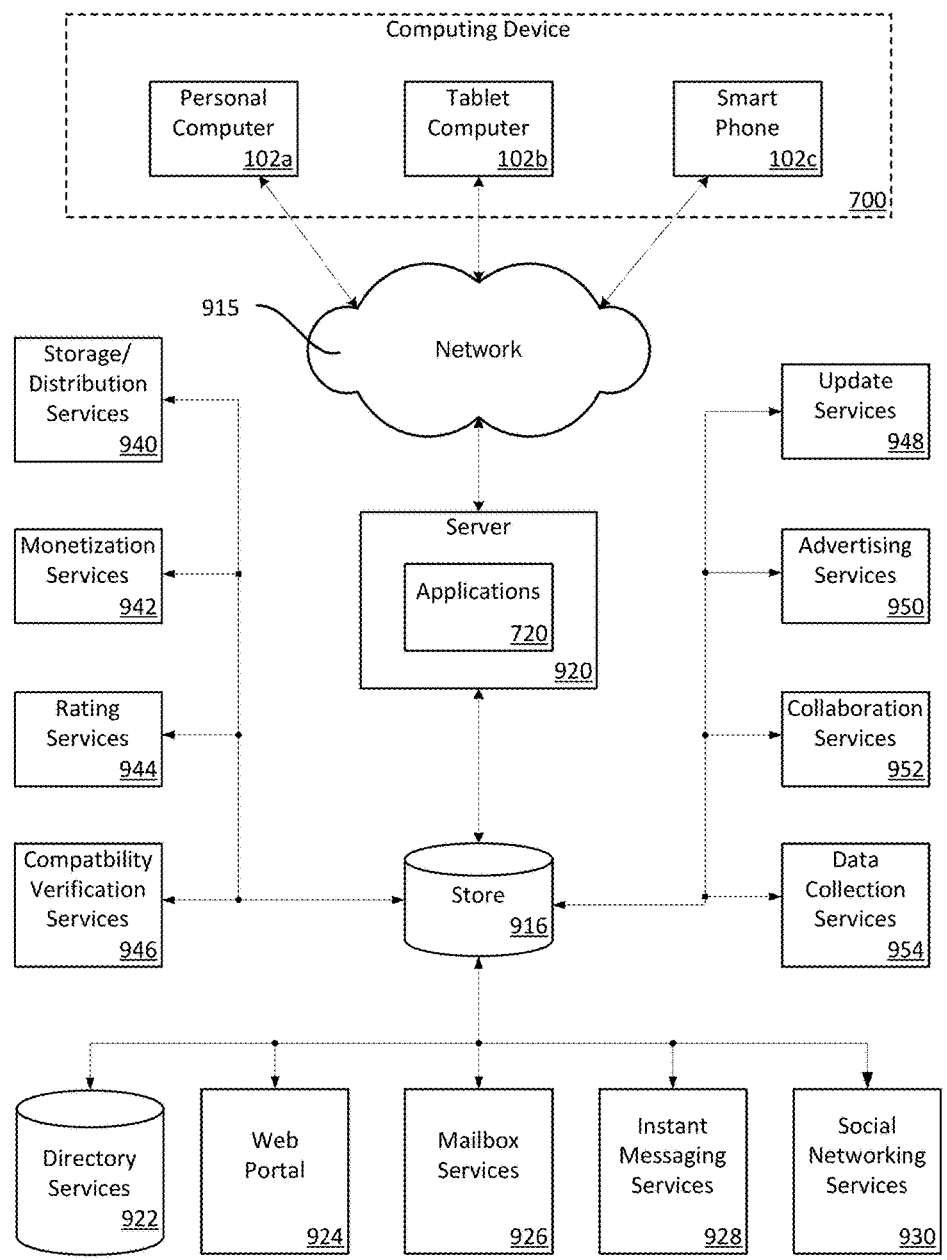
FIG. 9 is a simplified block diagram of a distributed computing system in which embodiments of the present invention may be practiced.

FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 7 is a block diagram illustrating physical components (i.e., hardware) of a computing device 700 with which embodiments of the invention may be practiced. The computing device components described below may be suitable for the computing devices described above including the personal computer 102*a*, the tablet computer 102*b*, and the smart phone 102*c*. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as the spreadsheet application 104 and the spreadsheet storytelling engine 108. The operating system 705, for example, may be suitable for controlling the operation of the computing device 700. Furthermore, embodiments of the invention may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the software applications 720 may perform processes including, but not limited to, one or more of the stages of the authoring method 400 and the storytelling method 500 illustrated in FIGS. 4 and 5. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the software applications 720 may be operated via application-specific logic integrated with other components of the computing device 700 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700.

FIGS. 8A and 8B illustrate a mobile computing device 800, for example, a mobile telephone, a smart phone, a tablet personal computer, a laptop computer, and the like, with which embodiments of the invention may be practiced. With reference to FIG. 8A, one embodiment of a mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including software applications 720 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one embodiment of the architecture of a system for providing spreadsheet storytelling functionality to one or more client devices, as described above. Content developed, interacted with, or edited in association with the software applications 720 may be stored in different communication channels or other storage types. For example, various documents may be stored using a directory service 922, a web portal 924, a mailbox service 926, an instant messaging store 928, or a social networking site 930. The software applications 720 may use any of these types of systems or the like for enabling data utilization, as described herein. A server 920 may provide the software applications 720 to clients. As one example, the server 920 may be a web server providing the software applications 720 over the web.

The server 920 may provide the software applications 720 over the web to clients through a network 915. By way of example, the client computing device may be implemented as the computing device 700 and embodied in a personal computer 102*a*, a tablet computer 102*b*, and/or a mobile computing device 102*c* (e.g., a smart phone). Any of these embodiments of the client computing device 102*a-c* may obtain content from the store 916.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for displaying a spreadsheet to convey information using a story, the method comprising the acts of:
    opening the spreadsheet and the story associated with the spreadsheet, wherein the story comprises:
        a first operation associated with a first object of the spreadsheet, wherein the first operation conveys information associated with the first object; and
        a second operation associated with a second object of the spreadsheet, wherein the second operation conveys information associated with the second object;
    displaying a storytelling user interface comprising playback controls for controlling playback of the story;
    performing a sequence of operations from the story to convey information to a consumer, wherein the sequence of operations comprises:
        performing the first operation, thereby conveying information for the first object; and
        after performing the first operation, performing the second operation, thereby conveying information for the second object.

2. The method of claim 1, further comprising hiding at least a portion of a user interface provided by the spreadsheet application during the act of performing a sequence of operations from the collection of operations in the story.

3. The method of claim 1, further comprising synchronizing the display of a single story for a plurality of consumers connected in a collaborative environment during performing a sequence of operations from the collection of operations in the story.

4. The method of claim 3, further comprising facilitating communication between the plurality of consumers connected in a collaborative environment during performing a sequence of operations from the collection of operations in the story.

5. The method of claim 3, further comprising facilitating communication between the consumer and a remote user between the plurality of consumers connected in a collaborative environment during performing a sequence of operations from the collection of operations in the story.

6. The method of claim 3, further comprising displaying advertisements during performing a sequence of operations from the collection of operations in the story.

7. The method of claim 3, further comprising communicating with a remote computer to determine if updates to the story are available during performing a sequence of operations from the collection of operations in the story.

8. The method of claim 3, further comprising the acts of:
    creating a view of at least a portion of a selected object from the spreadsheet; and
    displaying the view during performing a sequence of operations from the collection of operations in the story.

9. The method of claim 3, further comprising:
    recording the communications between the plurality of consumers connected in a collaborative environment; and
    storing the recorded communications with at least one of the story and the spreadsheet.

10. The method of claim 3 further comprising determining that an operation in the story is invalid due to modification of the spreadsheet by the consumer.

11. A system for creating a story to convey information in a spreadsheet, the system comprising a computing device having a processor and a memory in communication with the processor for executing a storytelling engine operable to:
    record a collection of operations associated with the spreadsheet, wherein the collection of operations comprises:
        a first operation relating to information about a first object of the spreadsheet, wherein the first operation is linked to the first object; and
        a second operation relating to information about a second object of the spreadsheet, wherein the second operation is linked to the second object; and
    generating the story comprising the collection of operations, wherein the story comprises an indication that the first operation and the second operation are performed sequentially; and
    associating the story with the spreadsheet for later playback by a consumer.

12. The system of claim 11, wherein the storytelling engine is further operable to record annotations for display throughout the entire story.

13. The system of claim 11, wherein the storytelling engine is further operable to record annotations for display at specific points in the story.

14. The system of claim 11, wherein the storytelling engine is further operable to add a decision element requiring input from the consumer.

15. The system of claim 14, wherein the storytelling engine is further operable to:
  record a first sequence of operations associated with the spreadsheet;
  record a second sequence of operations associated with the spreadsheet;
  link the first sequence of operations to a first value of the input to the decision element; and
  link the second sequence of operations to a first value of the input to the decision element.

16. The system of claim 14, wherein the storytelling engine is further operable to disable modification of the story by the consumer.

17. The system of claim 14, wherein the storytelling engine is further operable to save the story separately from the spreadsheet.

18. A computer readable medium containing computer executable instructions which, when executed by a computer, perform a method for displaying a spreadsheet to convey information using a story comprising a collection of operations, the method comprising the acts of:
  opening the spreadsheet;
  loading the story into the spreadsheet, wherein the story comprises:
    a first operation associated with a first object of the spreadsheet, wherein the first operation conveys information associated with the first object; and
    a second operation associated with a second object of the spreadsheet, wherein the second operation conveys information associated with the second object;
  initiating playback of a selected portion of the story, the selected portion being selected by a user interacting with the first object of the spreadsheet; and
  performing a sequence of operations corresponding to the selected portion of the story, wherein the sequence of operations comprises:
    performing the first operation, thereby conveying information for the first object; and
    after performing the first operation, performing the second operation, thereby conveying information for the second object.

19. The computer readable medium of claim 18, wherein the method further comprises verifying the story is compatible with spreadsheet.

20. The computer readable medium of claim 18, wherein the method further comprises locking the story and the spreadsheet from further modifications upon approval of the story and the spreadsheet.

* * * * *